June 8, 1937.  H. C. BOSTWICK  2,083,289
TIRE BUILDING FORM
Filed Aug. 14, 1936
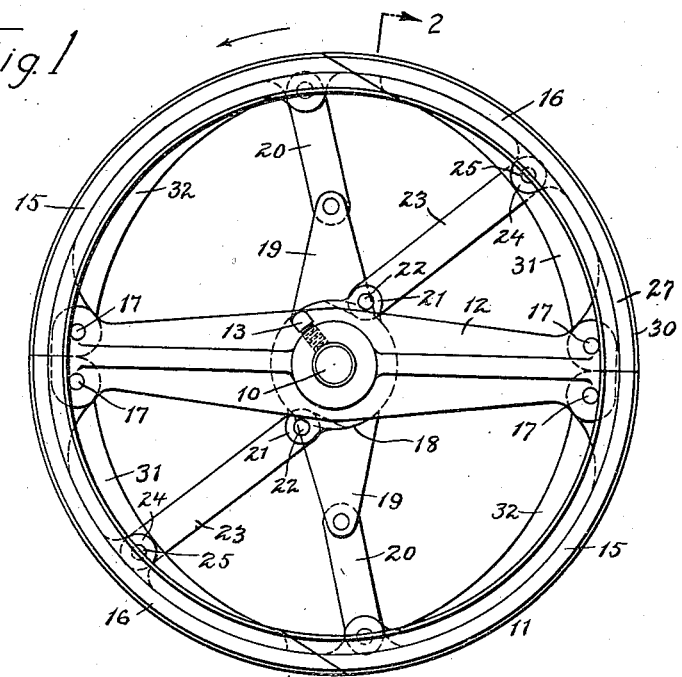
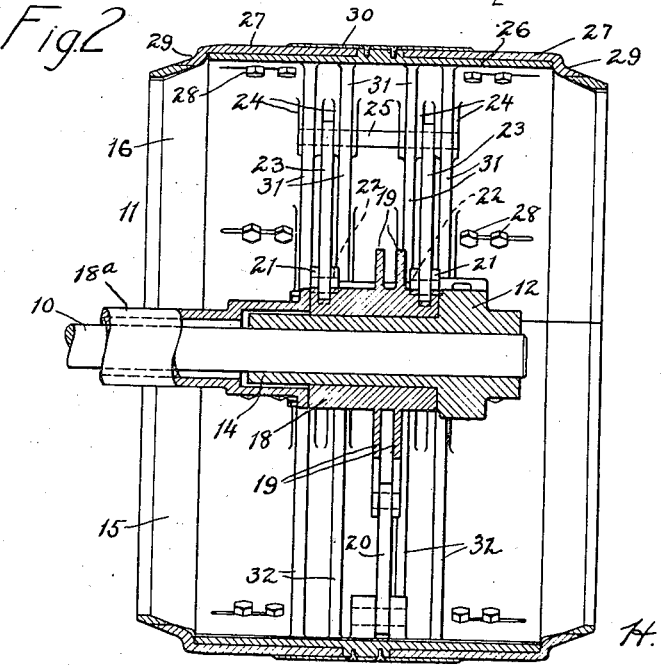
Inventor,
H. C. Bostwick,
By Robert M. Pierson,
Attorney Patented June 8, 1937

2,083,289

UNITED STATES PATENT OFFICE 2,083,289

TIRE BUILDING FORM

Henry C. Bostwick, Coventry Township, Summit County, Ohio, assignor to The Akron Standard Mold Company, Akron, Ohio, a corporation of Ohio Application August 14, 1936, Serial No. 96,059

3 Claims. (Cl. 154—9)

This invention relates to collapsible, segmental band-building forms, and especially to drums of the general type disclosed in my Patent No. 2,042,498 of June 6, 1936, for building tires by the semi-flat band method. Its principal object is to insure a tight closure of the segments while the drum is rotating in its expanded condition.

Drums of this type employ mechanism such as toggle linkage, operated by a central control collar which is rotatable relative to the drum shaft, for effecting their collapse. When the drum is of relatively large diameter it has been observed that, if only the usual form of linkage is employed, the free-end edges of the overlapping segments develop a tendency to "cock" or move out of parallelism with the drum axis, so as to slightly open up these segments by causing them to project radially at one corner more than at the other. Such an effect is objectionable and may produce a bruising or cutting of inner plies of the tire fabric where the stitching tools pass over the faulty joint. Having discovered that the trouble was due to an unbalanced resistance of the toggle linkage to the effects of centrifugal force upon different parts of the overlapping segments, I have devised the present invention to overcome the difficulty.

Of the accompanying drawing, Fig. 1 is a front elevation showing a tire-building drum constructed in accordance with my invention.

Fig. 2 is a diametric section thereof on the line 2—2 of Fig. 1.

In the drawing, 10 is the horizontal rotary power shaft of a tire building machine and 11 is the collapsible band-building drum or form carried at its outer end. Said drum comprises a two-armed spider 12 fixed on the shaft by a set screw 13 and formed with a hub sleeve 14, a drum body composed of two underlapping and two overlapping segments 15 and 16 pivoted upon pins 17 at the outer ends of the spider arms, to swing oppositely in couples for collapsing the drum body, and having their free ends meeting in semi-tangent beveled joints, and toggle means controlling the collapsing and expanding movements of the segments.

The toggle means comprises a concentric control collar 18 mounted to turn with or relative to the hub sleeve 14 of the spider and formed with opposite arms 19 to constitute a swing-arm structure or inner member of one pair of the controlling toggle devices. To the outer ends of the arms 19 are pivoted the inner ends of the usual short links 20 whose outer ends are pivotally connected with ears on the inner sides of the underlapping segments 15 near the free ends of the latter.

In accordance with my invention, additional pairs of shorter arms 21 are formed on the control collar 18 on opposite sides of the arms 19 and on opposite sides of a median radial plane of the drum for controlling each of the overlapping segments 16. Said shorter arms are pivotally connected by pins 22 with the inner ends of longer links 23 arranged in pairs, one pair for each overlapping segment, the outer ends of said links being connected between pairs of ears 24 on the inner sides of segments 16 by a common pin 25. The collar 18 is bolted to the end flange of a hollow shaft 18ᵃ surrounding the drum shaft 10 and adapted to be provided with the usual brake drum or hand-wheel (not shown) for retarding said control collar to collapse the drum.

The drum segments are composed as usual of base segments 26 collectively constituting a chuck body, wing segments 27 slidable axially thereon to constitute a widthwise adjustment and secured to the base segments by screws 28 having their stems in longitudinal slots, said wing segments being formed with depressed bead-seating flanges 29 and their inner margins being overlaid with gap-shield segments 30 attached to the base segments. The ears 24 for pivoting the outer ends of the toggle links 23 are inwardly formed on the base segments 26 and are constituted as portions of two pairs of inwardly projecting stiffening ribs 31 which flank the respective toggle links so that the drum has its greatest resistance to bending in the plane of application of the toggle forces to the overlapping segments. Similar pairs of stiffening ribs 32 are inwardly formed on each of the underlapping segments 15.

Normal forward rotation of the drum being counterclockwise when viewed from the front as indicated by the arrow in Fig. 1, if it is desired to collapse the drum by the power of its own rotation, the control collar 18 is retarded by applying a brake to its extension member 18ᵃ, causing the toggles formed by the arms on said collar and the links 20 and 23 respectively to break and thereby, through continued forward rotation of the drum body, drawing inwardly the segments in timed relation, first the underlapping segments 15 and then the overlapping segments 16, as in my aforesaid prior patent. A similar effect may be had on slowing down the drum and retarding the control collar by means of a hand-wheel, or by stopping the drum and reversely rotating said collar. Reverse rotation of the drum while the control collar 18 is held will expand the drum by power, or said drum may be automatically expanded by the action of centrifugal force on rotating it in either direction. The linear movement of the toggle knuckle pins and the relative length and disposition of the links 20 and 23 are such that, on completion of the expanding movement, the toggles 19, 20 of the underlapping segments do not quite reach a straightened condition, while the toggles 21, 23 of the overlapping segments are bent over-center slightly past the fully straightened position so that the free ends of the overlapping segments move outwardly beyond and then into the drum circle in reaching their operative position, as disclosed in my aforesaid patent.

The duplication of links 23 on opposite sides of a median radial plane of the drum, between the control collar 18 and each of the overlapping segments 16, balances the resistance offered by this linkage, to the action of centrifugal force upon said segments, which is particularly strong in a drum of relatively large diameter, and avoids the tendency to cocking of said segments and misalignment of their free ends which has been observed when the resistance is applied at only one point in the axial length of each segment, particularly when that point is not in the middle, and it avoids outward springing at the corners such as might occur with a single link even if centrally placed. Location of the single toggles 19, 20 for the underlapping segments in a plane between the aforesaid double toggles for the overlapping ones, provides a compact arrangement and a substantially balanced inward pull upon the underlapping segments when the drum is collapsed. Since this type of drum is adapted for power collapse in less than one complete rotation after the application of a brake as described, the strains upon the toggle mechanism, increasing as they do in proportion to the diameter of the drum, are very severe, and particularly so in the case of the overlapping segments, where the links 23 are outwardly connected about midway of the angular length of the segment as shown, instead of near the free end as with the underlapping segments. The described arrangement of double links 23, and the location of each of said links between a pair of reinforcing ribs 31, are well suited to withstand these strains.

It will be understood that the form of embodiment is subject to variation without departing from the scope of my invention as defined in the claims.

I claim:

1. Tire-building apparatus comprising a rotary segment support, a drum body composed of pivoted segments carried by said support and having their ends in overlapping and underlapping relation, and toggle mechanism for collapsing the drum, comprising a control member rotatable concentrically with or relative to said support, relatively long links connecting said member with the overlapping segments and arranged in pairs with members on opposite sides of a median radial plane of the drum, and relatively short links located in a plane between the long links and connecting said member with the underlapping segments.

2. Apparatus according to claim 1 in which the overlapping segments are formed on their inner sides with two pairs of circumferential stiffening ribs between the members of which the outer ends of the longer links are pivoted.

3. Band-building apparatus comprising underlapping and overlapping segments symmetrically arranged in pairs of opposite members forming a rotary drum body and movable inwardly to collapse said body, and toggle means controlling all segments for collapsing the drum body during rotation thereof, said means including a control member retardable angularly of the axis of rotation of the drum body and links pivotally connected at their inner ends with said member and at their outer ends with the underlapping and overlapping segments for concurrently moving both sets of segments, those links which are connected with each of the overlapping segments being in a pair disposed on opposite sides of a median radial plane of the drum body.

HENRY C. BOSTWICK.